United States Patent [19]

Nishi

[11] Patent Number: 5,349,692
[45] Date of Patent: Sep. 20, 1994

[54] INSTRUCTION HANDLING SEQUENCE CONTROL SYSTEM FOR SIMULTANEOUS EXECUTION OF VECTOR INSTRUCTIONS

[75] Inventor: Naoki Nishi, Tokyo, Japan

[73] Assignee: NEC Corporation, Tokyo, Japan

[21] Appl. No.: 72,083

[22] Filed: Jun. 7, 1993

Related U.S. Application Data

[62] Division of Ser. No. 331,970, Apr. 3, 1989, Pat. No. 5,241,633.

[30] Foreign Application Priority Data

Apr. 1, 1988 [JP] Japan .................................. 63-81519

[51] Int. Cl.⁵ .......................... G06F 9/06; G06F 9/26; G06F 9/302; G06F 9/38
[52] U.S. Cl. ............................... 395/800; 395/375; 364/DIG. 1; 364/229.5; 364/232.21; 364/230.6; 364/238.6; 364/243.42; 364/246.92; 364/258; 364/259.2; 364/259.8; 364/261; 364/261.9; 364/262.1; 364/262.3; 364/262.4; 364/272.9
[58] Field of Search ................. 395/800, 425, 206, 375

[56] References Cited

U.S. PATENT DOCUMENTS

| | | | |
|---|---|---|---|
| 4,128,880 | 12/1978 | Cray, Jr. ............................... | 395/800 |
| 4,493,020 | 1/1985 | Kim et al. ............................. | 395/375 |
| 4,739,472 | 4/1988 | Hayashi ................................ | 395/375 |
| 4,760,518 | 7/1988 | Potash et al. ........................ | 395/325 |
| 4,789,925 | 12/1988 | Lahti ..................................... | 395/800 |
| 4,794,521 | 12/1988 | Ziegler et al. ....................... | 395/425 |
| 4,807,115 | 2/1989 | Torng ................................... | 395/375 |
| 4,847,754 | 7/1989 | Obermarck et al. ................. | 395/650 |
| 4,866,598 | 9/1989 | Sonnek et al. ....................... | 395/275 |
| 4,870,569 | 9/1989 | Nakatani et al. ..................... | 395/800 |
| 4,873,630 | 10/1989 | Rusterholz et al. ................. | 395/800 |
| 4,893,233 | 1/1990 | Denman et al. ..................... | 395/375 |
| 4,903,264 | 2/1990 | Talgam et al. ....................... | 371/16.1 |
| 4,972,314 | 11/1990 | Getzinger et al. ................... | 395/425 |
| 4,974,145 | 11/1990 | Aoyama et al. ...................... | 395/800 |
| 5,241,633 | 8/1993 | Nishi ..................................... | 395/800 |

OTHER PUBLICATIONS

Anderson et al., "The IBM System/360 Model 91: Machine Philosophy and Instruction Handling", IBM Journal of Research & Development, vol. 11, No. 1, IBM, Jan. 1967, pp. 8-24.

Weiss et al., "Instruction Issue Logic for Pipeland Supercomputers", 11th Annual International Symposium on Computer, IEEE, 1984, pp. 110-118.

Feng; "The Supertek S-1 Mini Computer" Mar. 1988.

Primary Examiner—Lawrence E. Anderson
Assistant Examiner—L. Donahue
Attorney, Agent, or Firm—Foley & Lardner

[57] ABSTRACT

An computer program instruction sequence control system to allow parallel or simultaneous execution of instructions. The system begins by loading two instructions for sequence determination. The system then checks if either instruction reads from or writes into the other instruction, if both instructions reference the same address, or if either instruction will contend with a currently executing instruction for the registers, arithmetic unit, or main memory. If no interference occurs, both instructions will be issued in parallel or simultaneously.

2 Claims, 10 Drawing Sheets

```
VLOAD   VR0 ← (base,    5, 256)    1st instruction
VLOAD   VR1 ← (base,+1  5, 256)    2nd instruction
VADD    VR0 ← VR0,VR1              3rd instruction
VSTORE  VR0 → (base,    5, 256)    4th instruction
VLOAD   VR2 ← (base+2, 5, 256)
VLOAD   VR3 ← (base+3  5, 256)
VMULT   VR2 ← VR2,VR3
VSTORE  VR2 → (base+4, 5, 256)
```

FIG.6A

| VLOAD VR1 ←(base+1, 5, 256) 2nd instruction | Instruction "2" |
| VLOAD VR0 ←(base, 5, 256) 1st instruction | Instruction "1" |

FIG.6B

| VADD VR0 ← VR0,VR1             3rd instruction | Instruction "2" |
| VLOAD VR1 ←(base+1, 5, 256) 2nd instruction | Instruction "1" |

FIG.6C

| VSTORE VR0←(base, 5, 256) 4th instruction | Instruction "2" |
| VADD VR0← VR0,VR1              3rd instruction | Instruction "1" |

FIG.6D

| VLOAD VR2 ←(base+2 5, 256) 5th instruction | Instruction "2" |
| VSTORE VR0 ←(base, 5, 256) 4th instruction | Instruction "1" |

FIG.6E

| VLOAD VR3 ←(base+3, 5, 256) 6th instruction | Instruction "2" |
| VSTORE VR0 ←(base, 5, 256) 4th instruction | Instruction "1" |

FIG.6F

| VMULT VR2 ← VR2,VR3             7th instruction | Instruction "2" |
| VLOAD VR3 ←(base+3, 5, 256) 6th instruction | Instruction "1" |

FIG.6G

| VSTORE VR2 ←(base+4 5, 256) 8th instruction | Instruction "2" |
| VMULT VR2 ← VR2,VR3             7th instruction | Instruction "1" |

INSTRUCTION HANDLING SEQUENCE CONTROL SYSTEM FOR SIMULTANEOUS EXECUTION OF VECTOR INSTRUCTIONS

This application is a division, of application Ser. No. 07/331,970, filed April 3, 1989, now U.S. Pat. No. 5,241,633.

BACKGROUND OF THE INVENTION

The present invention relates to an instruction handling sequence control system for use in a vector computer to issue and execute instructions without following the sequence of instruction execution designated by a program.

A system to increase the speed of instruction handling by dynamically determining the sequence of instruction handling and issuing instructions to the arithmetic unit and the main storage processing unit without following a program-designated sequence is used in computers for scalar processing. For details of this system, reference may be made to D. W. Anderson et al., "The IBM System/360 Model 91: Machine Philosophy and Instruction-Handling", IBM Journal of Research & Development, vol. 11, No.1, IBM, January 1967, pp. 8–24, and S. Weiss et al., "Instruction Issue Logic for Pipelined Supercomputers", 11th Annual International Symposium on Computer, IEEE, 1984, pp. 110–118.

The computers controlling the sequence of instruction handling have means to detect collisions of the input/ output operands and memory addresses of instructions, judge how the arithmetic unit and the main storage handling unit are used, and decide on the issue of instructions to the arithmetic unit and the main storage handling unit without following a programmed sequence. This instruction issuing system can be as well applied to vector computers as to scalar computers. In a vector computer, however, it is difficult to judge whether a plurality of memory referencing vector instructions can be supplied to the main storage handling unit in a sequence reverse to what is designated by a program. Thus, the store starting point address of a vector store instruction designated for programmed execution being represented by base1; the distance between the elements of the vector to be stored under the vector store instruction, by dist1; the length of the vector to be stored thereunder, by len1 (len1≧1); the load starting point address of a vector load instruction designated for programmed execution after the vector store instruction being represented by base2; the distance between the elements of the vector to be loaded under said vector load instruction, by dist2; and the length of the vector to be loaded thereunder, by len2 (len2≧1), it is judged that the vector load instruction may reference the main store earlier than said vector store instruction only when the set of intersections between {base1, base1 +dist1×1, base1+dist1×2, ..., base1+dist1×(len1−1)}, which is the set of addresses to be stored under the vector store instruction, and {base2, base2+dist2×1, base2+dist2×2, ..., base2+dist2×(len2−1)}, which is the set of addresses to be loaded under the vector load instruction, is void. It is difficult, however, to pass judgement in a short period of time on an arbitrary combination of bas1, dist1, len1 (len1≧1), base2, dist2, len2 (len2≧1).

In this connection, there is proposed, as applicable to cases permitting simple judgment, a method to determine the overlapping of address ranges by which referencing the main store by a vector load instruction ahead of a vector store instruction can be allowed if the set of intersections between {add1: base1 ≦add1 ≦(base1×-dist1×(len1−1))}whose address set elements range from a store starting point address base1, designated by a preceding vector store instruction, to base1×dist1×-(len1−1)), the final store address of the same vector store instruction, and {add2: base2 ≦. add2 ≦(base2×-dist2×(len2−1)) }whose address set elements range from a load starting point address base2, designated by a following vector load instruction, to base2+(len2−1) ×dist2, the final load address of the same vector load instruction, is void. While this method permits the needed judgment with comparative ease, the combinations of base1, dist1, len1 ( len1≧1 ), base2, dist2 and len2 (len2≧1) allowing correct judgment of passability are limited. Thus the method to determine the overlapping of address ranges has the disadvantage that, out of the 24 possible sequential relationship among base1, last1, base2 and last2, at most the following eight:

(base1≦last1≦base2≦last2)
(base1≦last1≦last2≦base2)
(last1≦base1≦base2≦last2)
(last1≦base1≦last2≦base2)
(base2≦last2≦base1≦last1)
(last2≦base2≦base1≦last1)
(base2≦last2≦last1≦base1)
(last2≦base2≦last1≦base1)

permit correct judgment, where base1 is the store starting point address of a vector store instruction designated for programmed execution; dist1, the inter-elemental distance of the vector to be stored under the vector store instruction; len1 ( len1≧1 ), the vector length f to be stored thereunder; last1, the address of the final vector element to be stored thereunder; base2, the load starting point address of a vector load instruction designated for programmed execution after the vector store instruction; dist2, the inter-elemental distance of the vector to be loaded under the vector load instruction; len2 ( len2≧1), the vector length to be loaded thereunder; and last2, the address of the final vector element to be loaded thereunder.

SUMMARY OF THE INVENTION

An object of the present invention, therefore, is to provide an instruction handling sequence control system which is cleared of the aforementioned disadvantage and capable of passing judgment in a short period of time on a greater variety of combinations of base1, dist1, len1, base2, dist2 and len2 as to the reversibility of the sequence of instructions with respect to referencing the main storage.

According to one aspect of the present invention, there is provided an instruction handling sequence control system comprising first means for holding a group of instructions to be issued to a vector operating unit and a main storage handling unit; second means for holding the states of the vector register, operating unit and main storage unit used under an instruction being executed; third means for determining, out of the group of instructions held by the first means and on the basis of the states of the resources held by the second means, an instruction to be issued to the vector operating unit and the main storage handling unit without conforming to the programmed sequence of instruction issues; and another means for issuing, with respect to a vector store instruction in the group of instructions held by the first means and a vector load instruction in the group of instructions held by the first means, programmed to be issued after the vector store instruction, the vector load instruction before the vector store instruction to the vector operating unit and the main storage handling unit when the distance between vector elements designated by the vector store instruction is equal to that designated by the vector load instruction, the store starting point address designated by the vector store instruction is unequal to the load starting point address designated by the vector load instruction, and the difference between the store starting point address designated by the vector store instruction and the load starting point designated by the vector load instruction is smaller than the distance between vector elements designated by the vector load instruction.

BRIEF DESCRIPTION OF THE DRAWINGS

The objects, features and advantages of the present invention will become more apparent from the detailed description hereunder when taken in conjunction with the accompanying drawings, in which:

FIGS. 6A, 6B, 6C, 6D, 6E, 6F, and 6G illustrate how instructions are stored in the instruction storage section 2 of FIG. 1;

In the figures, the same reference numerals denote respectively the same constituent elements.

DETAILED DESCRIPTION OF THE PREFERRED EMBODIMENT

Figure 1:
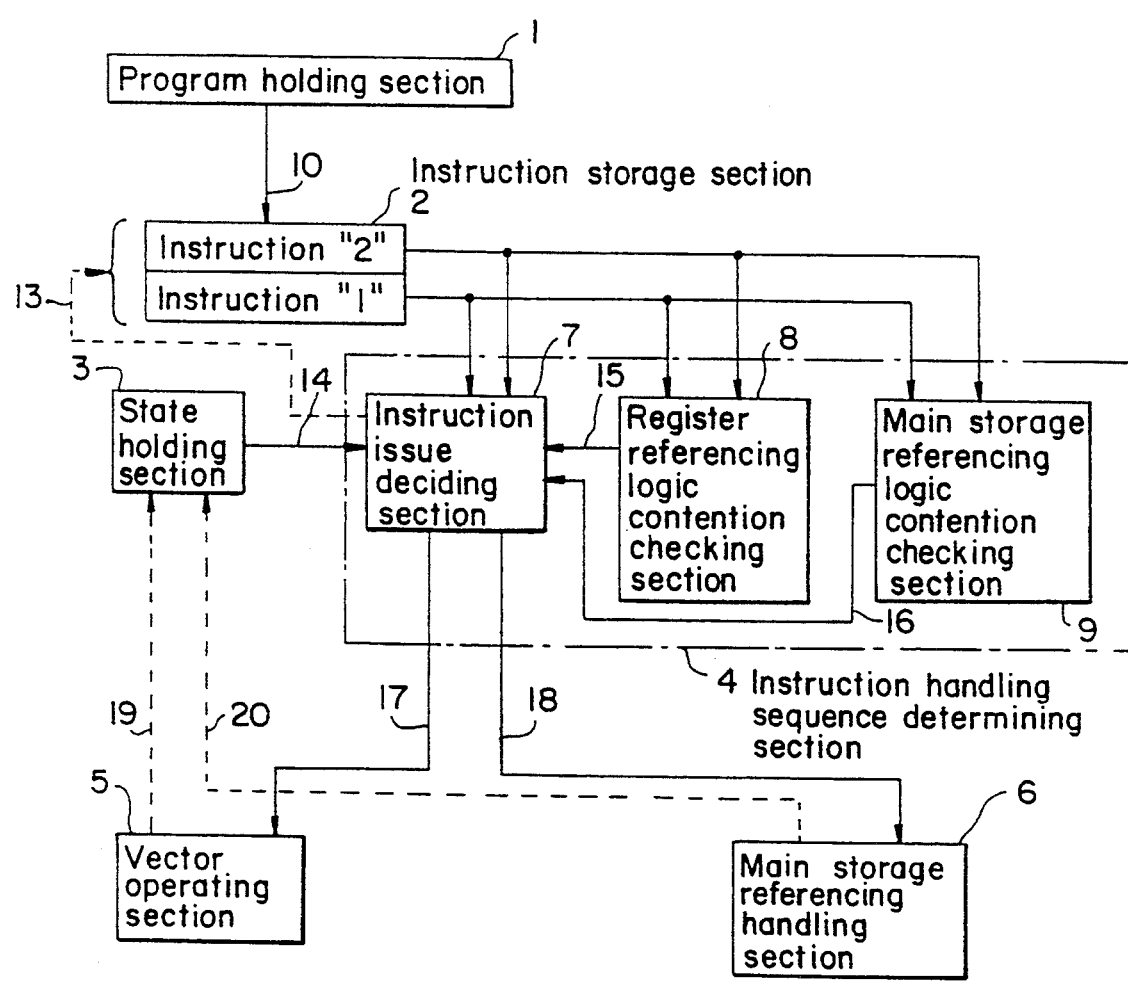
FIG. 1 illustrates a preferred embodiment of the invention.

Referring to FIG. 1, a preferred embodiment of the present invention comprises a program holding section 1 for storing a program; an instruction storage section 2 for storing a plurality of Instructions "1" and "2" from the program holding section 1, standing by to be issued; a vector operating section 5 consisting of a plurality of vector registers and one or more arithmetic units; a main memory referencing handling section 6 for controlling access to a main storage unit; a state holding section 3 for holding the states of the vector registers, arithmetic unit(s) and main storage unit used under an instruction being executed; and an instruction handling sequence determining section 4 for determining instructions to be issued to the vector operating section 5 and main memory referencing handling section 6 on the basis of instructions from the instruction storage section 2 and information on the states of the resources from the state holding section 3 without conforming to the programmed sequence of instruction issues.

The instruction storage section 2, every time a vacancy arises therein, stores a succeeding instruction in accordance with a programmed sequence. This section 2 holds, for instance, two instructions including Instruction "1" and Instruction "2" in such a manner that what precedes in the programmed sequence is kept as Instruction "1" and what succeeds, as Instruction "2".

The instruction handling sequence determining section 4 comprises a main memory referencing logic contention checking section 9, register referencing logic contention checking section 8 and instruction issue deciding section 7.

Figure 2:
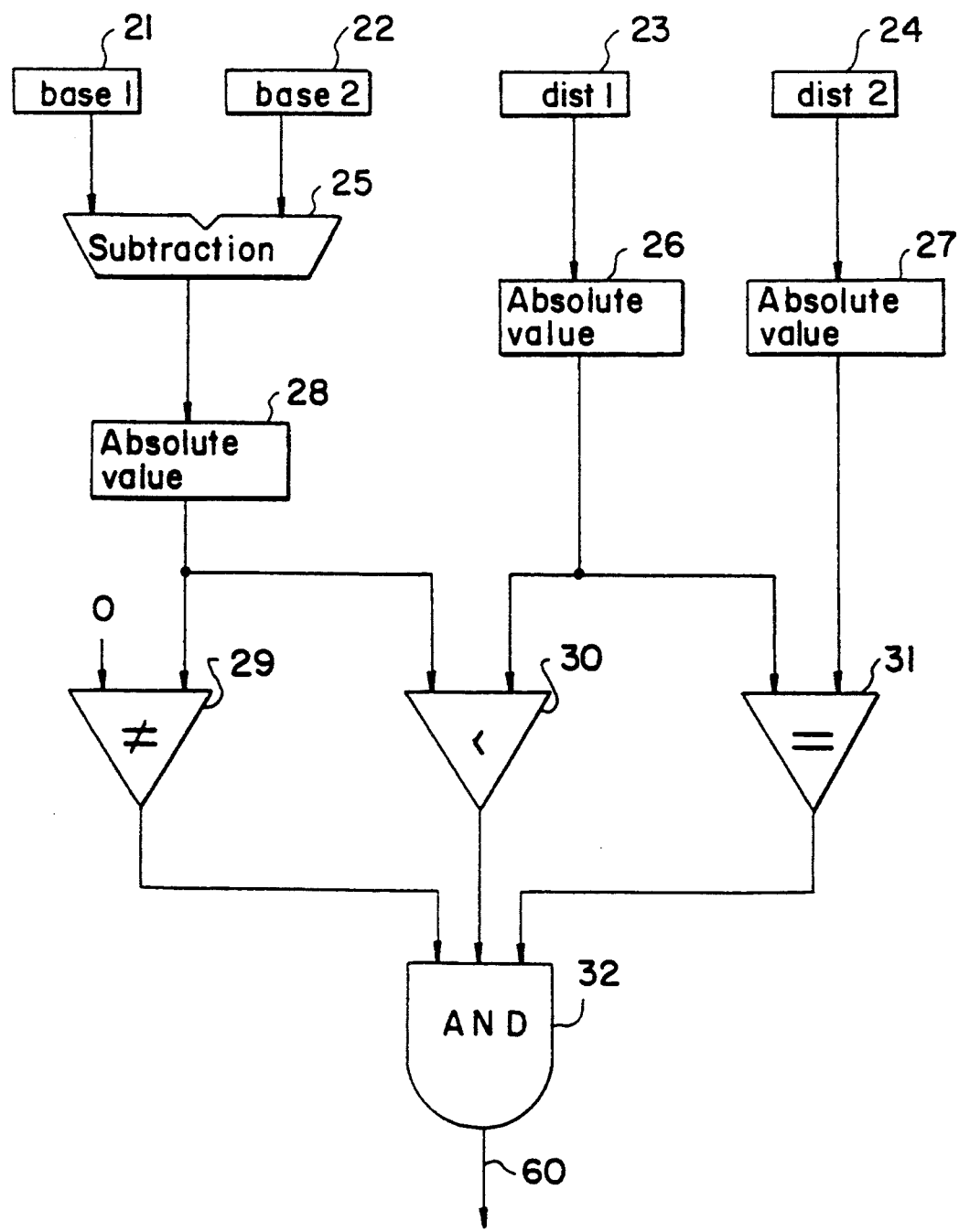
FIGS. 2 and 3 illustrate examples of the main memory referencing logic contention checking section 9 of FIG. 1.

Referring now to FIG. 2, the main memory referencing logic contention checking section 9 further consists of a register 21 for storing the vector access starting point address (base1) of Instruction "1"; a register 22 for storing the vector access starting point address (base2) of Instruction "2"; a register 23 for storing the inter-elemental distance (dist1) to be vector-accessed under Instruction "1"; a register 24 for storing the inter-elemental distance (dist2) to be vector-accessed under Instruction "2"; a subtractor circuit 25; absolute value circuits 26, 27 and 28; a comparator 29 for judging whether or not a relationship of inequality holds; another comparator 30 for judging whether or not a relationship of one value being greater than the other holds; still another comparator for judging whether or not a relationship of equality holds; and a three-input AND circuit 32.

Figure 7:
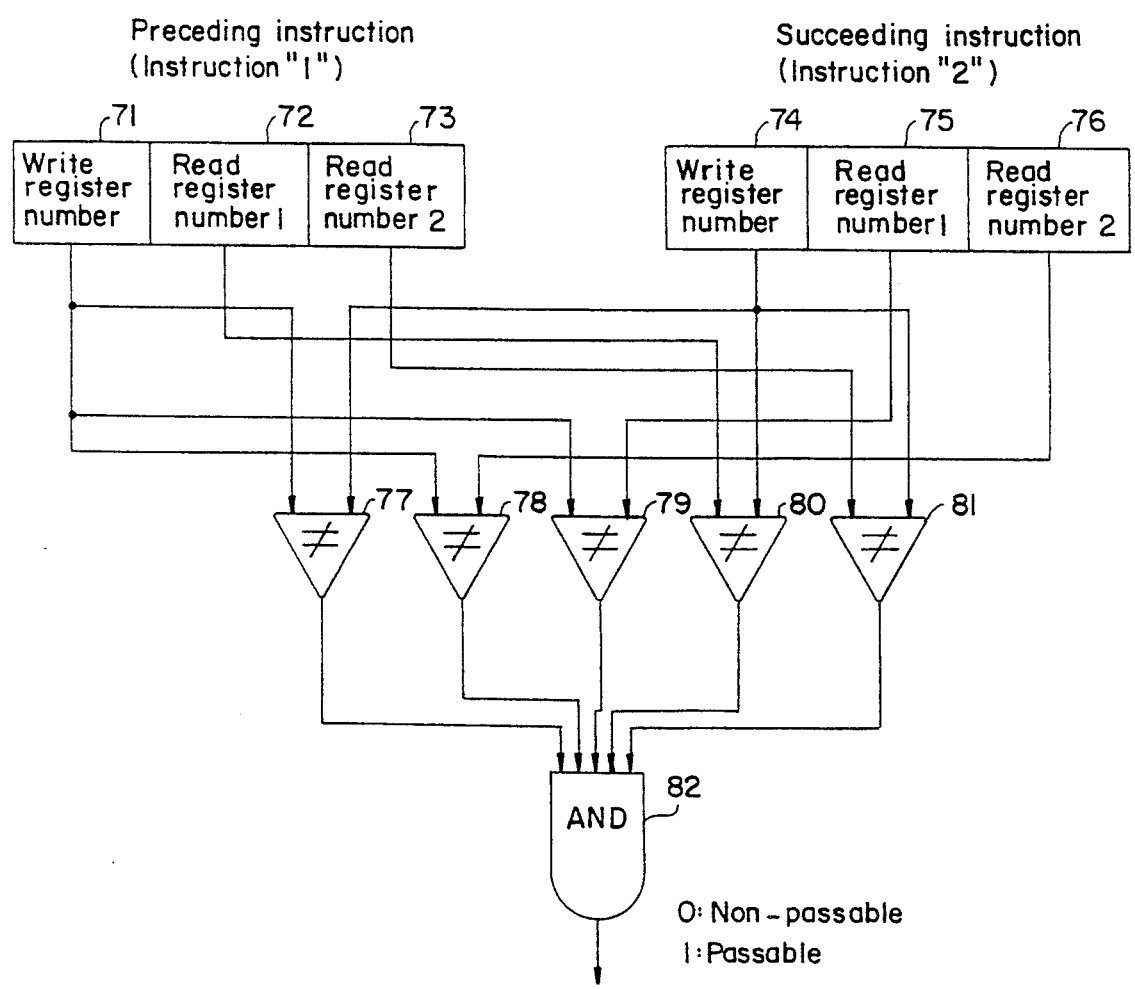
FIG. 7 illustrates the detailed configuration of the register referencing logic contention checking section 8.

Referring to FIG. 7, the register referencing logic contention checking section 8 comprises a comparator circuit 77 for comparing the write register number 71 of the preceding Instruction "1" and the write register number 74 of the succeeding Instruction "2", and outputting a signal when the two numbers are not identical; a comparator circuit 78 for comparing the write register number 71 of the preceding Instruction "1" and a second read register number 76 of the succeeding Instruction "2", and outputting a signal when the two numbers are not identical; a comparator circuit 79 for comparing the write register number 71 of the preceding Instruction "1" and a first read register number 75 of the succeeding Instruction "2", and outputting a signal when the two numbers are not identical; a comparator circuit 80 for comparing a first read register number 72 of the preceding Instruction "1" and the write register number 74 of the succeeding Instruction "2"; a comparator circuit 81 for comparing a second read register number 73 of the preceding Instruction "1" and the write register number 74 of the succeeding Instruction "2"; and an AND gate 82 for obtaining the logical product of the outputs of the comparator circuits 77 through 81.

"Passability of an instruction" basically requires satisfaction of all of the three following conditions.

First, no succeeding instruction should read out the contents of a register in which the results of the execution of a preceding instruction are stored.

Second, no succeeding instruction should write into a register from which a preceding instruction is to read out.

Third, the write register of a preceding instruction and that of a succeeding instruction should not be the same register.

The register referencing logic contention checking section 8 illustrated in FIG. 7 is an example of circuit presenting such requirements; if the output of its AND gate 82 is logical "0", passing is prohibited or, if it is logical "1", passing is allowed The second requirement can be eliminated by so composing this checking section 8 that the content of the read register for the preceding instruction is copied in advance. Thus, before the execution of passing by the succeeding instruction, the content of the register read out by the preceding instruction is buffered. In this case, even if the succeeding instruction writes into a register from which the preceding instruction is to read out, the preceding instruction can be properly executed by using the prebuffered value as the value of the read register for the preceding instruction.

Figure 8:
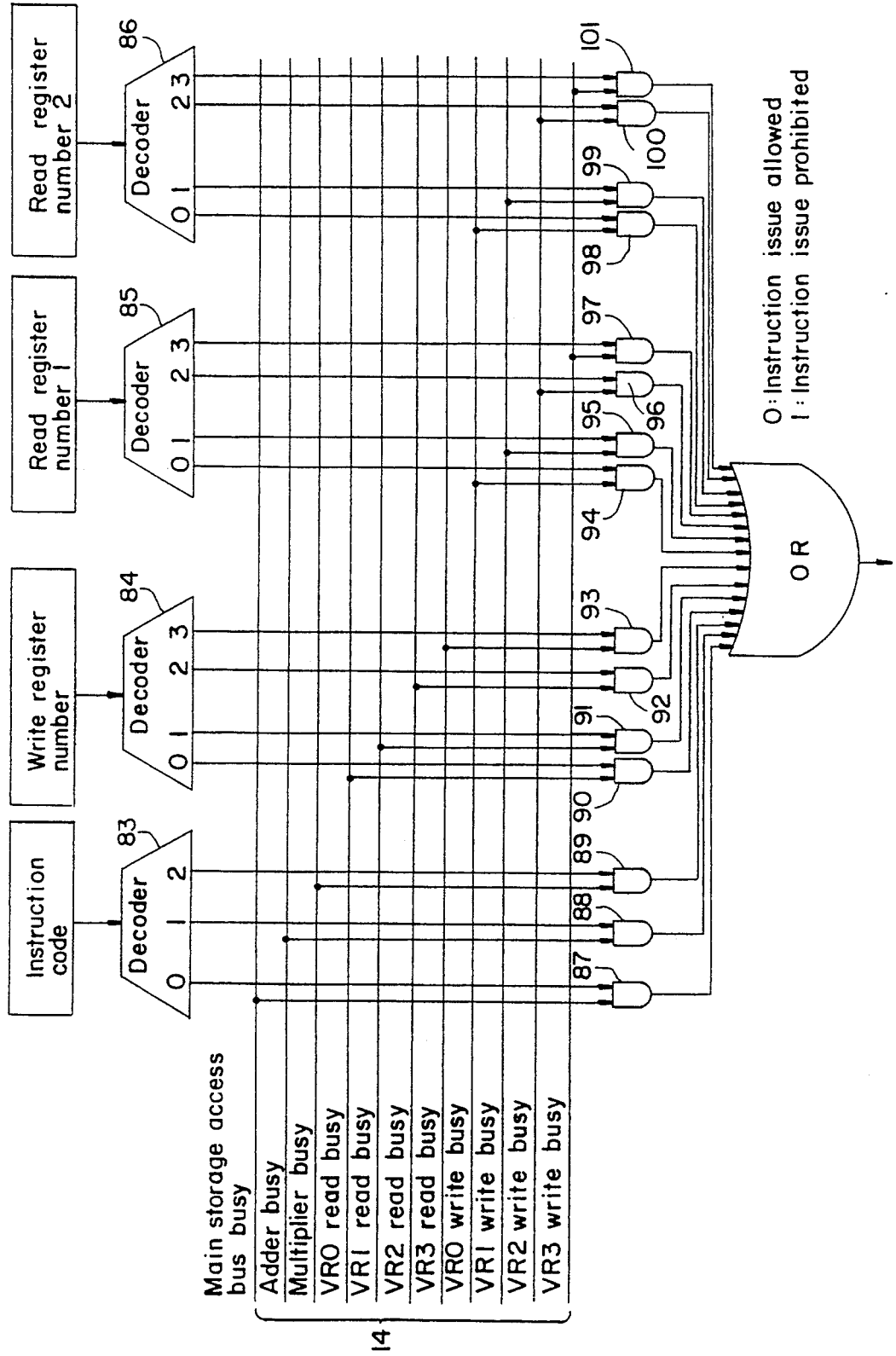
FIG. 8 illustrates the detailed configuration of part of the instruction issue deciding section 7.

Next, the instruction issue deciding section 7 will be described in detail. Referring to FIG. 8, an instruction issue permit/forbid signal generating circuit, one of the main constituents of the instruction issue deciding section 7, is provided for each of the preceding and succeeding instructions. Each such circuit comprises a decoder 83 for decoding the instruction code; a decoder 84 for decoding the write register number; a decoder 85 for decoding the first read register number; a decoder 86 for decoding the second read register number; a group of AND gates 87 through 101 for obtaining logical products between the decoding results of these decoders 83 through 86 and state signals each indicating a busy or an unbusy state, fed from the state holding section 3 of FIG. 1 via a line 14; and an OR gate 102 for obtaining the logical sum of the outputs of the AND gates 87 through 101.

This instruction issue permit/forbid signal generating circuit judges whether or not a given instruction can be issued (executed). The signals indicating a busy or an unbusy state, fed from the state hold section 3 via the line 14, refer only to a main memory access bus, an adder, a multiplier and registers (VR0 to VR3). The types of such signals, however, are not limited to these, but there can be more, depending on the configurations of the vector operating section 5 and the main memory referencing handling section 6. Here are shown, for the sake of describing convenience, only the minimum required check signals.

The decoder 83 generates output signals listed in Table 1 below correspondingly to the value of the instruction code.

TABLE 1

| Instruction Code | Output signal 0 | Output signal 1 | Output signal 2 |
|---|---|---|---|
| VLOAD | 1 | 0 | 0 |
| VSTORE | 1 | 0 | 0 |
| VMULT | 0 | 0 | 1 |
| VADD | 0 | 1 | 0 |

The decoders 84 through 86 generate output signals listed in Table 2 below correspondingly to the value of the register number.

TABLE 2

| Register Number | Output signal 0 | Output signal 1 | Output signal 2 | Output signal 3 |
|---|---|---|---|---|
| VR0 | 1 | 0 | 0 | 0 |
| VR1 | 0 | 1 | 0 | 0 |
| VR2 | 0 | 0 | 1 | 0 |
| VR3 | 0 | 0 | 0 | 1 |

Next will be described the operation by way of a typical program shown in FIG. 4.

Figures 4, 5A:
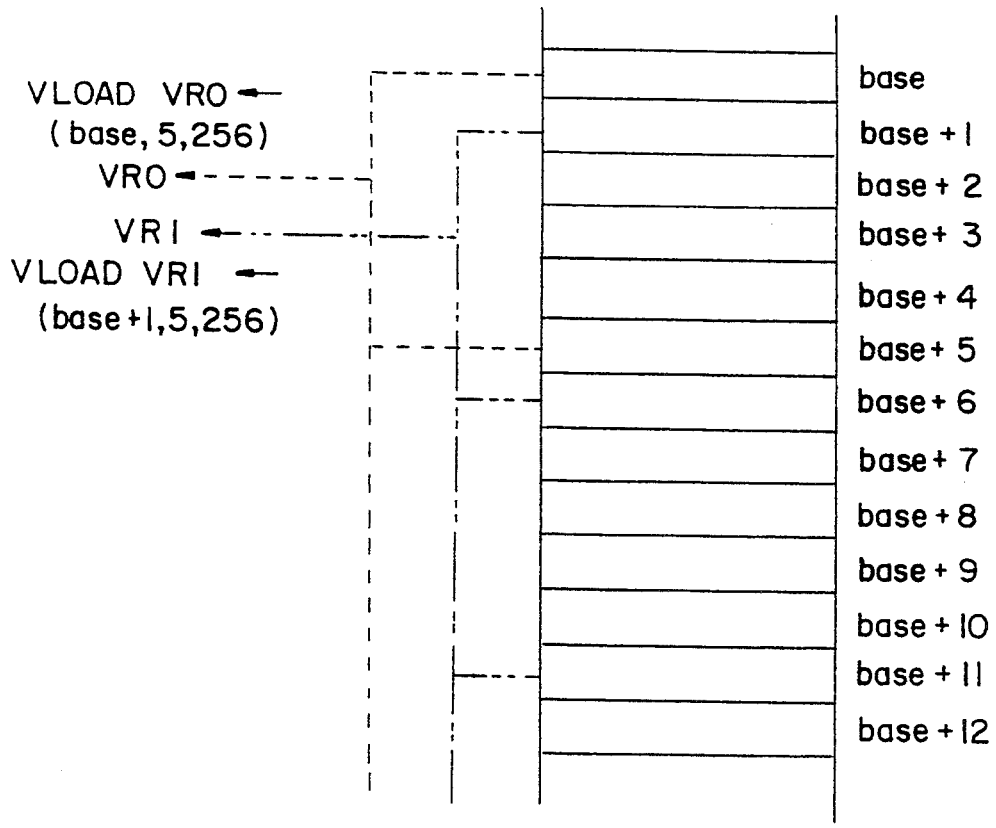
FIG. 4 illustrates an example of program for explaining the operation of the invention.
FIGS. 5A and 5B illustrate how vector load/store instructions reference the main storage.

Referring to FIG. 4, VLOAD denotes the instruction code of vector load; VADD, that of vector addition; VSTORE, that of vector store; and VMULT, that of vector multiplication. Each of VR0 through VR3 denotes the vector register of an instruction operand, and each vector register is supposed to be able to store 256 vector elements. An instruction operand represented by a set of three, (a, b, c) denotes the main storage operand of a vector load/store instruction, with a corresponding to the starting point of vector access, b, to the distance between vector elements and c, to the vector length. The first instruction, "VLOAD VR0←(base, 5, 256)", for instance, requires loading of such vector elements as the memory starting point address of "base", the distance between vector elements of "5" and the vector length of "256" into the vector register VR0.

Figure 5B:
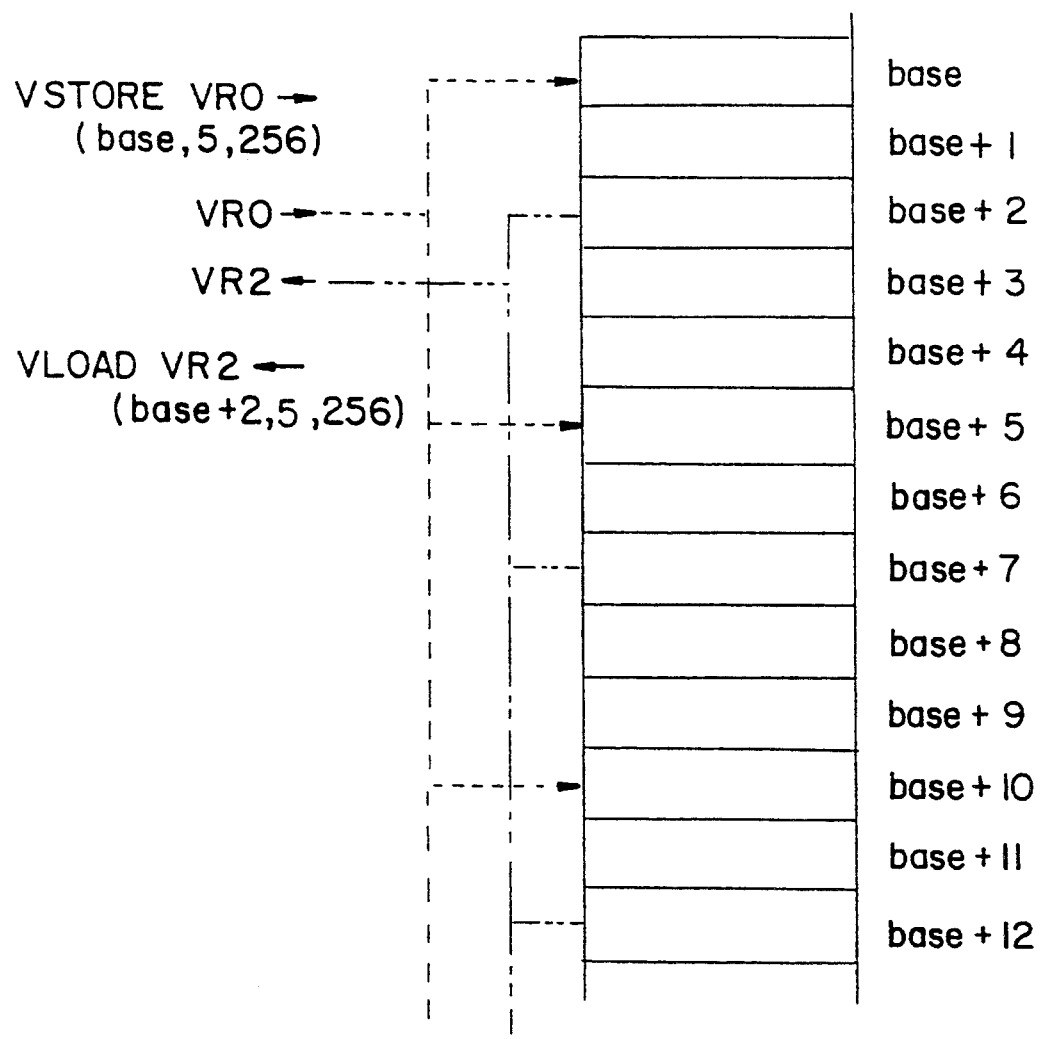

Now will be described with reference to FIG. 5 the sequence of referencing the main storage under the program shown in FIG. 4. FIG. 5A shows the memory address referenced by the first instruction of FIG. 4 and the main storage access instruction, second in the same figure. As both of these first two are vector load instructions and there is no contention for a vector register between them, they are executed in the programmed sequence. Next, after the execution of the first two instructions is started, the third instruction, a vector add instruction, is put to execution in synchronism with the loading of operands into the vector register VR0 and VR1, but the fourth instruction, a vector store instruction, to write the result of the execution of said add instruction into the main storage cannot be executed before the result of the addition is written into the VR0. Meanwhile the fifth instruction, a vector load instruction, is not for loading the result of storing under the fourth vector store instruction, and accordingly can be executed ahead of the fourth instruction.

The essence of the present invention consists in the judgment that this fourth vector store instruction can be passed by the fifth vector load instruction with respect to referencing the main storage. According to the invention, the passability can be determined because the fourth vector store instruction and the fifth vector load instruction are equal to each other in the distance between vector elements (|5| in both), the former's store starting point address (base) is unequal to the latter's load starting point address (base+2), and the difference between the former's store starting point address and the latter's load starting point address (|base+2−base|=2) is smaller than the inter-elemental distance of the fourth vector store instruction (|5|=5).

The instruction issue deciding section 7 will now be described in detail below on this basis with reference to actual instructions.

VLOAD VR0←(base, dist, len)

As the instruction code is VLOAD, this instruction cannot be issued if the main storage access memory is busy at the moment. As the write register number is VR0, this instruction cannot be issued if VR0 is busy reading at the moment.

VSTORE VR1→(base, dist, len )

As the instruction code is VSTORE, this instruction cannot be issued if the main storage access memory is busy at the moment. As the read register number is VR1, this instruction cannot be issued if VR1 is busy writing at the moment.

VMULT VR2←VR0, VR1

As the instruction code is VMULT, this instruction cannot be issued if the multiplier is busy at the moment. As the write register number is VR2, this instruction cannot be issued if VR2 is busy reading at the moment. Further, as the read registers are VR0 and VR1, this instruction cannot be issued if either of these registers is busy writing at the moment.

The generating circuits of FIG. 8 are intended to check, with respect to these three examples, if the hardware resources to be used under the instruction now to be issued are used under an instruction already issued and now being executed.

Referring again to FIG. 1, the final judgment by the instruction issue deciding section 7 is given on the combined basis of the result of judgment by the main memory referencing logic contention checking section 9 provided via a line 16, and by the register referencing logic contention checking section 8 provided via a line 15 and those of the generating circuits of FIG. 8 provided corresponding to the preceding and succeeding instructions.

The relationships among them are shown in Table 3.

signals indicate what instructions in execution make the respective units busy.

The first instruction (VLOAD VR0←(base, 5, 256)) will be taken up as an example. As this instruction is taken out of a queue standing by for execution and its actual execution started, the main storage access bus and VR0 are made busy to be written into. The release timing of the busy state differs between the main storage access bus busy and the VR0 write busy. For the main storage access bus, the busy state continues until immediately before the main storage access bus becomes available for use by the succeeding VLOAD/VSTORE instructions, while the VR0 register remains busy to be written into until immediately before the succeeding instruction to read out of the VR0 is actually allowed to read.

Whereas the type of busy signal and the setting of its release timing vary with the configurations of the vec-

TABLE 3

| Judgment result of main storage referencing logic contention checking section | Judgment result register referencing logic contention checking section | Judgment result by instruction issue deciding section | | Final action of instruction issue deciding section |
|---|---|---|---|---|
| | | Judgment on preceding instruction (Instruction "1") | Judgment on succeeding instruction (Instruction "2") | |
| Any | Any | Issue permitted | Any | Instruction "1" issued |
| Any | Any | Issue prohibited | Issue prohibited | No action |
| Passing prohibited | Passing prohibited | Issue prohibited | Issue permitted | No action |
| Passing prohibited | Passing permitted | Issue prohibited | Issue permitted | No action |
| Passing permitted | Passing prohibited | Issue prohibited | Issue permited | No action |
| Passing permitted | Passing permitted | Issue prohibited | Issue permitted | Instruction "2" issued |

Now, before describing the operation of the preferred embodiment of the present invention, the relationships between the states of execution of instruction and different busy signals will be described in detail with reference to FIGS. 9 and 10.

First will be described the states of execution of the instructions.

Figure 9:
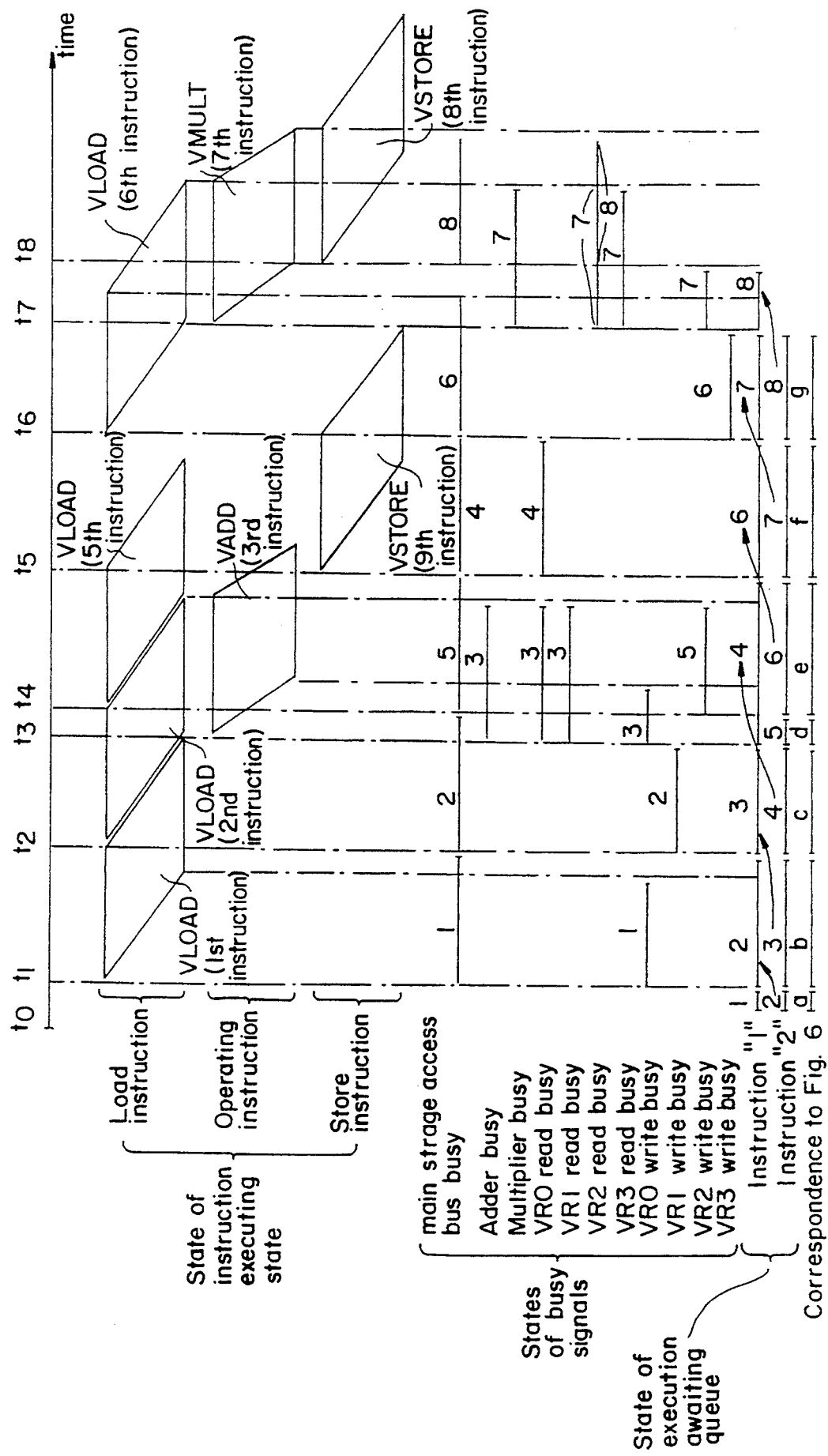
FIG. 9 illustrates how instructions are executed and how different busy signals vary with the execution of the instructions.
Figure 10:
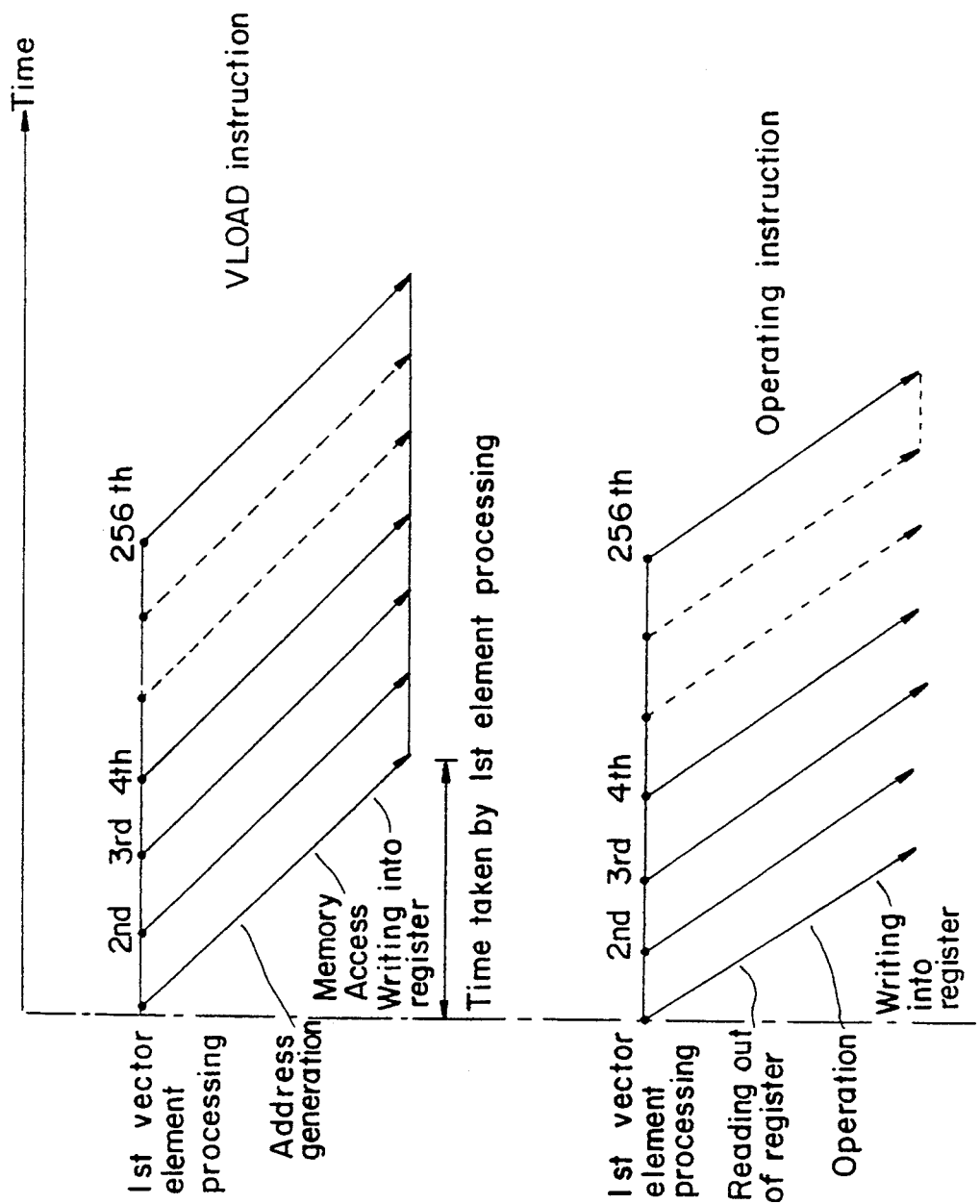
FIG. 10 illustrates how instructions are executed.

Referring to FIG. 9, the states of execution of the instruction including VLOAD, VADD, VMULT and VSTORE are represented by parallelograms. The meaning of the parallelogram will be explained with reference to FIG. 10. In a vector operation, the processing of main storage referencing, arithmetic operation and so forth is achieved in a pipeline system. Therefore, first, second, third vector elements and so on are simultaneously processed in a pipeline manner. Each oblique side of the parallelogram represents the progress of processing of one of these elements over time. Each horizontal side of same denotes the progress of successive processing of new vector elements.

The steps of vector element processing in vector loading, for example, are address generation, main storage accessing and storing of read data into vector registers.

Those in vector operations (VADD and VMULT), for instance, are reading out of vector registers, arithmetic operation and storing of the results of operation into vector registers.

Next will be described changes in the states of busy signals.

Referring to FIG. 9, solid lines indicate that the busy signals they represent are ON. Numerals over the busy tor operating section and of the main storage handling section, reading out of each vector register in this particular embodiment is supposed to permit simultaneous handling in response to read demands by a plurality of instructions.

Next, the operation of the preferred embodiment of the present invention will be described in detail by way of the typical program of FIG. 4 with reference to FIGS. 1, 2, 6 and 9.

Referring to FIGS. 1, 2, 6 and 9, first in the state of an execution awaiting queue 2 in the initial state (at point of time $t_0$ in FIG. 9), the vector load instruction, the first in the program, is set as Instruction "1", and the vector load instruction, the second in same, as Instruction "2" (the state of FIG. 6(a)). The register referencing logic contention checking section 8 notifies the instruction issue deciding section 7 of the passability because the register into which Instruction "1", given the precedence by the program, is to write is not referenced by Instruction "2", succeeding according to the program, for reading and because the register to be referenced by Instruction "2" for writing is not referenced by Instruction "1" for reading. The main storage referencing logic contention checking section 9, having the circuitry illustrated in FIG. 2, notifies the instruction issue deciding section 7 of the passability because the main storage reference starting point address base1 of Instruction "1" is unequal to the main storage reference starting point address base2 of Instruction "2", the vector reference inter-elemental distance of Instruction "1" is unequal to the main storage reference inter-elemental distance of Instruction "2", and the difference between the main storage reference starting point address base1 of Instruction "1" and the main storage reference starting point address base2 of Instruction "2" is smaller than the vector reference inter-elemental distance of Instruction "1". The instruction issue deciding section 7 determines, according to a signal from the state holding section 3 that neither Instruction "1" nor Instruction "2" contends for the registers, arithmetic unit and main storage handling section used by the instruction currently under execution. It is therefore judged that either Instruction "1" or "2" can be issued and there is no logical sequential relationship between Instructions "1" and "2", so that the vector load instruction, the first for Instruction "1", is issued (at point of time $t_1$ in FIG.9).

In the next state of the execution awaiting queue 2, there are set the vector load instruction, and second in the program, as Instruction "1", and the vector add instruction, the third in same, as Instruction "2" (the state of FIG. 6(b) ). The register referencing logic contention checking section 8 notifies the instruction issue deciding section 7 of the non-passability because the register into which Instruction "1", given the precedence by the program, is to write is referenced by Instruction "2", succeeding according to the program, for reading. The main storage referencing logic contention checking section 9 passes no judgment because Instruction "1" does not reference the main storage. The instruction issue deciding section 7 issues the vector load instruction, the second for Instruction "1", at such a timing that the main memory referencing handling section 6 can handle the next instruction in accordance with a signal from the state holding section 3 because a signal from the register referencing logic contention checking section 8 indicates non-passability between Instructions "1" and "2" (at point of time $t_2$ in FIG. 9).

In the following state of the execution awaiting queue 2, there are set the vector add instruction, the third in the program, as Instruction "1", and the vector store instruction, the fourth in same, as Instruction "2" (the state of FIG. 6(c)). The register referencing logic contention checking section 8 notifies the instruction issue deciding section 7 of the non-passability because the register into which Instruction "1", given the precedence by the program, is to write is referenced by Instruction "2", succeeding according to the program, for reading. The main storage referencing logic contention checking section 9 passes no judgment because Instruction "1" does not reference the main storage. The instruction issue deciding section 7 issues the vector and instruction, the third for Instruction "1", at such a timing that the vector registers VR0 and VR1 permit reading in accordance with a signal from the state holding section 3 because a signal from the register referencing logic contention checking section 8 indicates non-passability between Instructions "1" and "2" (at point of time $t_3$ in FIG. 9).

In the next state of the execution awaiting queue 2, there are set the vector store instruction, the fourth in the program, as Instruction "1", and the vector load instruction, the fifth in same, as Instruction "2" (the state of FIG. 6(d)). The register referencing logic contention checking section 8 notifies the instruction issue deciding section 7 of the passability because the register into which Instruction "1", given the precedence by the program, is to write is not referenced by Instruction "2", succeeding according to the program, for reading and because the register to be referenced by Instruction "2" for writing is not referenced by Instruction "1" for reading. The main storage referencing logic contention checking section 9, having the circuitry illustrated in FIG. 2, notifies the instruction issue deciding section 7 of the passability because the main storage reference starting point address base1 of Instruction "1" is unequal to the main storage reference starting point address base2 of Instruction "2", the vector reference inter-elemental distance of Instruction "1" is equal to the main storage reference inter-elemental distance of Instruction "2", and the difference between the main storage reference starting point address base1 of Instruction "1" and the main storage reference starting point address base2 of Instruction "2" is smaller than the vector reference inter-elemental distance of Instruction "1". The instruction issue deciding section 7 issues the vector load instruction, the fifth for Instruction "2", because, according to a signal from the state holding section 3 the vector store instruction for Instruction "1" cannot be issued before the result of processing of the third vector add instruction, issued in the previous state, begins to be written into the vector register VR0 and Instruction "2" can pass Instruction "1" (at point of time $t_4$ in FIG. 9).

In the ensuing state of the execution awaiting queue 2, there, are set the vector store instruction, the fourth in the program, as Instruction "1", and the vector load instruction, the sixth in same, as Instruction "2" ( the state of FIG. 6(e)). It is supposed that the result of the processing of the third vector add instruction, earlier issued for execution, has begun to be written into the vector register VR0 by this point of time. The register referencing logic contention checking section 8 notifies the instruction issue deciding section 7 of the passability because the register into which Instruction "1", given the precedence by the program, is to write is not referenced by Instruction "2", succeeding according to the program, for reading and because the register to be referenced by Instruction "2" for writing is not referenced by Instruction "1" for reading. The main storage referencing logic contention checking section 9, having the circuitry illustrated in FIG. 2, notifies the instruction issue deciding section 7 of the passability because the main storage reference starting point address base1 of Instruction "1" is unequal to the main storage reference starting point address base2 of Instruction "2", the vector reference inter-elemental distance of Instruction "1" is equal to the main storage reference inter-elemental distance of Instruction "2", and the difference between the main storage reference starting point address base1 of Instruction "1" and the main storage reference starting point address base2 of Instruction "2" is smaller than the vector reference inter-elemental distance of Instruction "1". The instruction issue deciding section 7 determines, according to a signal from the state holding section 3 that neither Instruction "1" nor Instruction "2" contends for the registers, arithmetic unit and main storage handling section used by the instruction currently under execution. It is therefore judged that either Instruction "1" or "2" can be issued and there is no logical sequential relationship between Instructions "1" and "2", so that the vector store instruction, the fourth for Instruction "1", is issued (at point of time $t_5$ in FIG. 9).

Thereafter, the state of the execution awaiting queue 2 changes to those of FIG. 6(f) and FIG. 6(g) by the same procedure.

Whereas this preferred embodiment of the invention, as described above, judges the logical passability between two vector/main storage referencing instructions in an oblique relationship to each other, the execution awaiting queue 2 can be enlarged to permit three or more entries. While this embodiment concerns passing of a vector store instruction by a vector load instruction, the invention can as well be applied to passing of one vector store instruction by another, of one vector load instruction by another or of a vector load instruction by a vector store instruction.

It is also made possible to pass judgment on both oblique and overlapping relationships of addresses by adding a circuit which determines passability with respect to main storage referencing if the main storage referencing logic contention checking section 9 judges that the set of intersections between {add1: base1 $\leq$ add1 $\leq$ (base1 $\times$ dist1 $\times$ (len1 $-$ 1))} whose address set elements range from a store starting point address base1, designated by a preceding vector store instruction, to base1 $\times$ dist1 $\times$ (len1 $-$ 1), the final store address of the same vector store instruction, and {add2: base2 $\leq$ add2 $\leq$ (base2 $\times$ dist2 (len2 $-$ 1))} whose address set elements range from a load starting point address base2, designated by a following vector load instruction, to base2 $+$ (len2 $-$ 1) $\times$ dist2, the final store address of the same vector load instruction, is void.

Another example of the main storage referencing logic contention checking section 9 for judging an overlapping relationship between addresses will now be described in detail with reference to FIG. 3.

Figure 3:
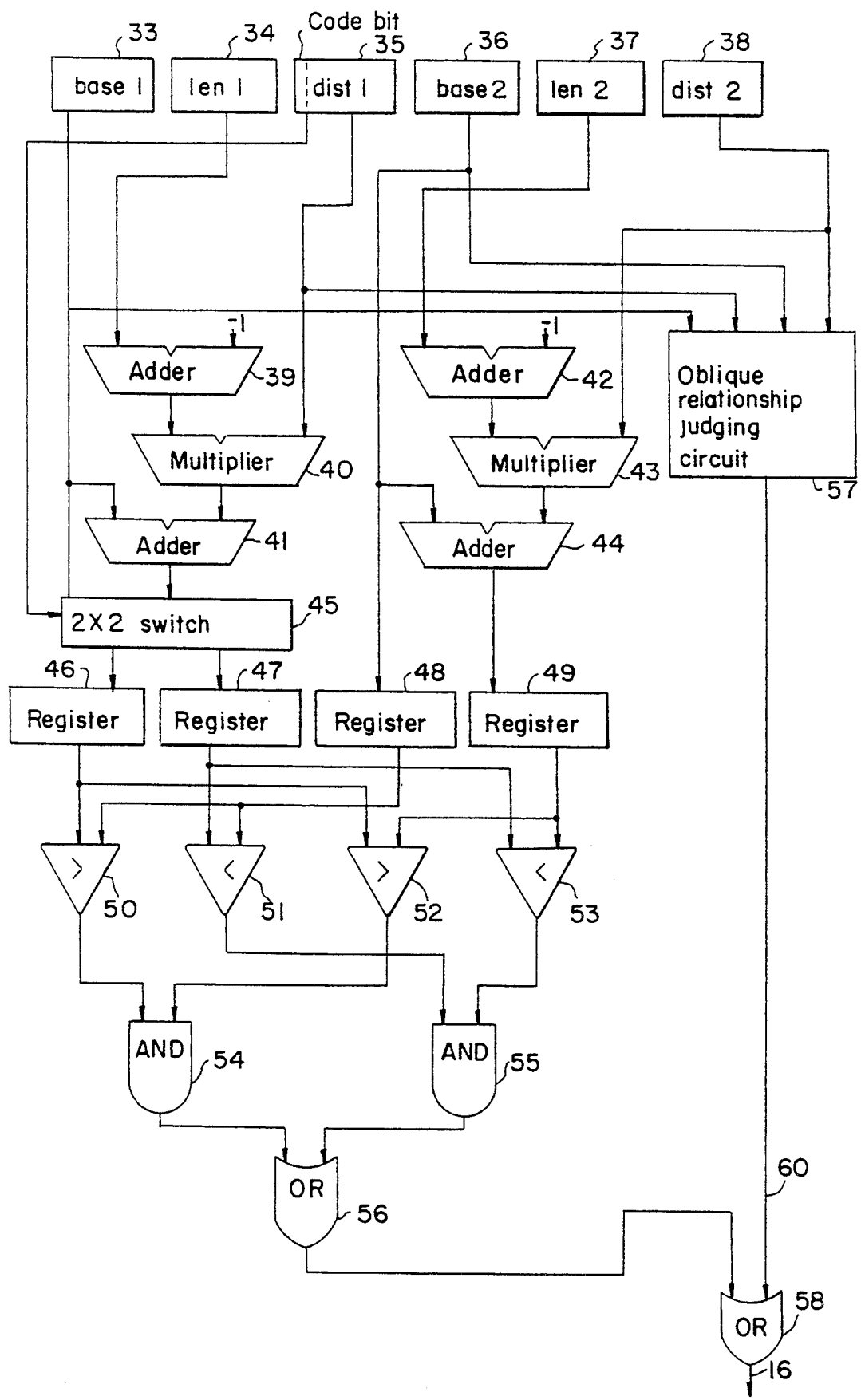

Referring to FIG. 3, the other example of the main storage referencing logic contention checking section 9 comprises a register 33 for storing the starting point address of vector accessing under Instruction "1" (base1); a register 34 for storing the vector length of vector accessing thereunder (len1); a register 35 for storing the inter-elemental distance of vector accessing thereunder (dist1); a register 36 for storing the starting point address of vector accessing under Instruction "2" (base2); a register 37 for storing the vector length of vector accessing thereunder (len2); a register 38 for storing the inter-elemental distance of vector accessing thereunder (dist2); an adder 39; a multiplier 40, an adder 41; an adder 42; a multiplier 43; an adder 44, a 2×2 switching circuit 45; registers 46 to 49; a comparator 50 for judging whether or not a relationship of one value being greater than the other holds; a comparator 51 for judging whether or not a relationship of one value being smaller than the other holds; a comparator 52 for judging whether or not a relationship of one value being greater than the other holds; a comparator 53 for judging whether or not a relationship of one value being smaller than the other holds; an OR circuit 54; an AND circuit 55; an OR circuit 56; an oblique relationship judging circuit 57; and an OR circuit 58.

The oblique relationship judging circuit 57 is the same as the corresponding one in FIG. 2. The 2×2 switching circuit 45 achieves a cross connection when the code section of the register 35 storing the inter-elemental distance of vector accessing under Instruction "1" (dist1) indicates a negative number and a non-intersecting connection when the code section of the register 35 storing the inter-elemental distance of vector accessing under Instruction "1" (dist1) indicates a positive number.

The present invention provides the advantage that, if the address on the main storage to be referenced by a vector store instruction and that to be referenced by a vector load instruction, programmed to follow the vector store instruction and equal in distance between vector elements to the vector store instruction, are in an oblique relationship to each other and the starting point address to be accessed by the vector store instruction and that to be accessed by the vector load instruction are not more distant from each other than the distance between vector elements of said vector store, passability with respect to main storage referencing can be correctly judged.

What is claimed is:

1. An instruction handling sequence control system for vector processing comprising:
   (a) a vector operating unit having one or more pipelined arithmetic units, a plurality of vector registers, and a network combining said one or more pipelined arithmetic unit and said vector registers;
   (b) a main storage handling unit for vector-based loading/storing between a main storage unit and said vector registers;
   (c) first means for holding a group of instructions to be issued to said vector operating unit and said main storage handling unit;
   (d) second means for holding states of resources being used by an instruction being executed, said resources including said vector registers, said one or more pipelined arithmetic units and said main storage unit; and
   (e) third means for determining, out of said group of instructions held by said first means and on the basis of the states of the resources held by said second means and instructions from said first means, whether a succeeding instruction may be issued to the vector operating unit and to the main storage handling unit prior to a preceding instruction without conforming to a programmed sequence of instructions, and when said succeeding and preceding instructions are memory referencing vector instructions, for judging that there is no logical sequential relationship between said succeeding instruction and said preceding instruction on the basis of addresses in said main storage unit referenced by said preceding and succeeding instructions, said third means including,
      means for determining a condition, with respect to a vector store instruction and a vector load instruction in the group of instructions held by said first means, said vector load instruction being programmed to be issued after said vector store instruction, said condition being determined when a distance between vector elements designated by said vector store instruction is equal to a distance between vector elements designated by said vector load instruction, a store starting point address designated by said vector store instruction is unequal to a load starting point address designated by said vector load instruction, and a difference between the store starting point address designated by said vector store instruction and the load starting point designated by said vector load instruction is smaller than a distance between vector elements designated by said vector load instruction, and
      means for issuing, upon determination of said condition, with respect to said vector store instruction and said vector load instruction, said vector load instruction before said vector store instruction to the vector operating unit and the main storage handling unit.

2. An instruction handling sequence control system for vector processing comprising:
   (a) a vector operating unit having one or more pipelined arithmetic units, a plurality of vector registers, and a network combining said one or more pipelined arithmetic units and said vector registers;
   (b) a main storage handling unit for vector-based loading/storing between a main storage unit and said vector registers;
   (c) first means for holding a group of instructions to be issued to said vector operating unit and said main storage handling unit;
   (d) second means for holding states of resources being used by an instruction being executed, said resources including said vector registers, said one or more pipelined arithmetic units and said main storage unit; and
   (e) third means for determining, out of the group of instructions held by said first means and on the basis of the states of the resources held by said second means and instructions from said first means, whether a succeeding instruction may be issued to the vector operating unit and the main storage handling unit prior to a preceding instruction without conforming to a programmed sequence of instructions, and when said succeeding and preceding instructions are memory referencing vector instructions, for judging that there is no logical sequential relationship between said succeeding instruction and said preceding instruction on the basis of addresses in said main storage unit referenced by said preceding and succeeding instructions, said third means including,
   register referencing logic contention checking means, coupled to said first means, for checking logical contention between operand registers of a preceding instruction and a succeeding instruction held by said first means,
   main memory referencing logic contention checking means, coupled to said first means, for checking logic contention of memory references of said preceding and succeeding instructions, according to a vector access starting address, an interelement distance and a length of a vector of each said preceding and succeeding instructions,
   instruction issue designation means, coupled to said first and second means, said register referencing logic contention checking means and said main memory referencing logic contention checking means for determining if said succeeding instruction is allowed to issue according to the states held by said second means, and a result from said register referencing logic contention checking means and a result from said main memory referencing logic contention checking means, and
   wherein said main memory referencing logic contention checking means includes,
      a first register for storing a first vector access starting address of said preceding instruction,
      a second register for storing a second vector access starting address of said succeeding second instruction,
      a third register for storing a first interelement distance for vector-accessing with said preceding instruction,
      a fourth register for storing a second interelement distance for vector-accessing with said succeeding instruction,
      a subtracter, said subtracter coupled to said first and second registers,
      first, second, and third absolute value circuits, said absolute value circuits coupled to said subtracter and said third and fourth registers,
      first, second, and third comparators coupled to said first, second, third absolute value circuits, respectively, and
      an AND circuit coupled to said first, second, and third comparators.

* * * * *